UNITED STATES PATENT OFFICE.

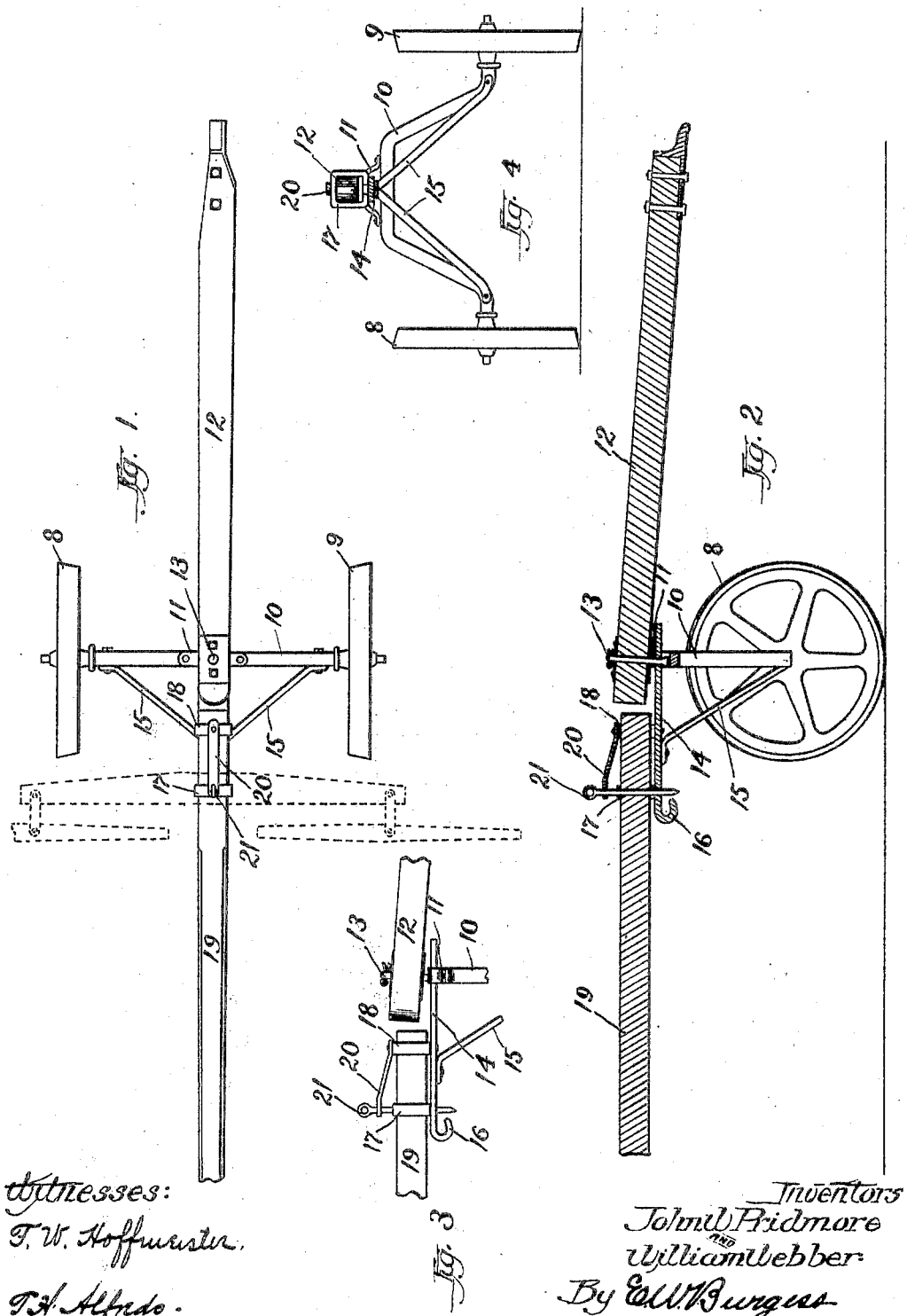

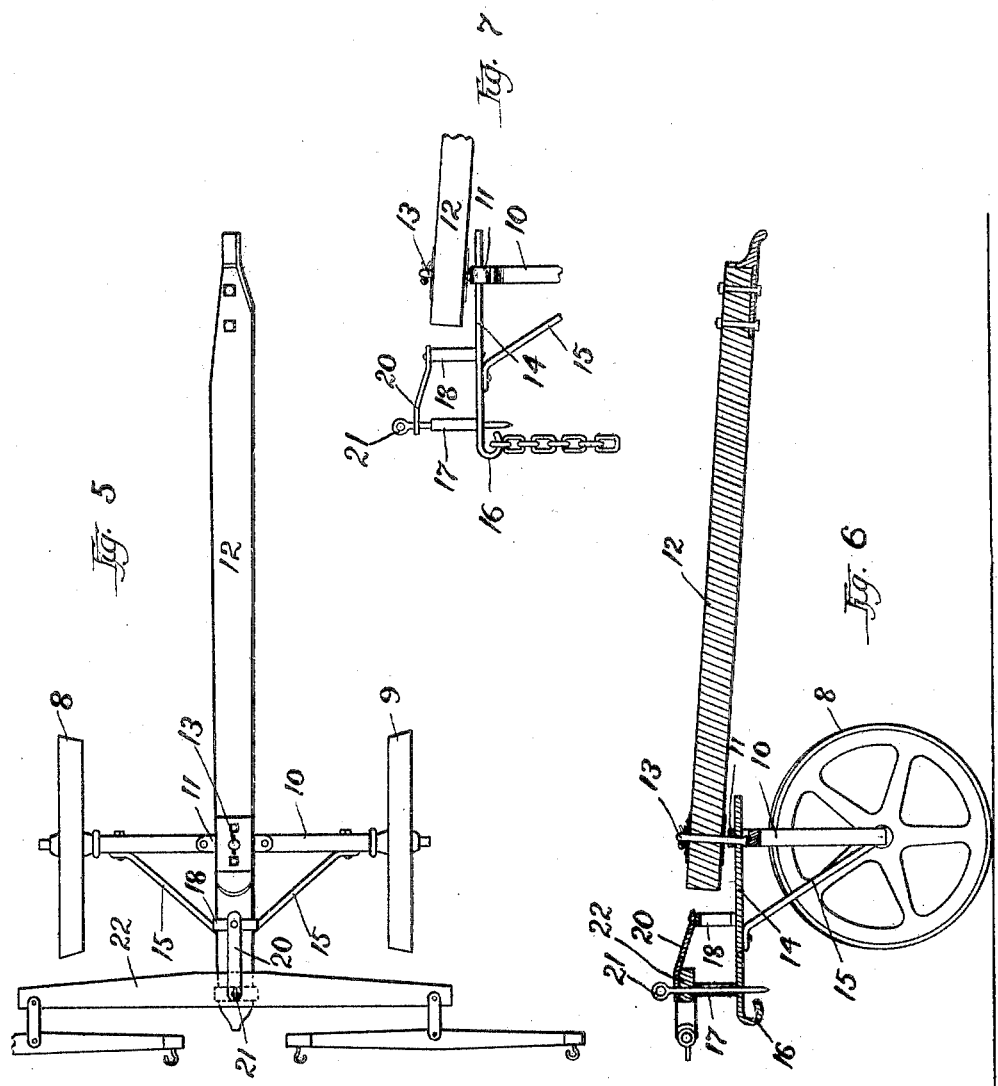

JOHN W. PRIDMORE AND WILLIAM WEBBER, OF CHICAGO, ILLINOIS, ASSIGNORS TO INTERNATIONAL HARVESTER COMPANY, A CORPORATION OF NEW JERSEY.

TONGUE-TRUCK.

No. 802,315.　　　Specification of Letters Patent.　　　Patented Oct. 17, 1905.

Application filed March 3, 1905. Serial No. 248,258.

*To all whom it may concern:*

Be it known that we, JOHN W. PRIDMORE and WILLIAM WEBBER, citizens of the United States, residing at Chicago, in the county of Cook and State of Illinois, have invented certain new and useful Improvements in Tongue-Trucks, of which the following is a specification, reference being had to the accompanying drawings, forming a part thereof.

Our invention relates to tongue-trucks, and is particularly designed for use with harvesting and such like machines. Its objects are to provide such a device that will be strong and cheaply constructed and adapted for use with two draft-animals, a tongue, and eveners, with two draft-animals and eveners alone, or with one or more draft-animals and dispensing with both tongue and eveners, and to so construct the device that it may be readily changed from one to another of the above forms. We attain these objects by the mechanism illustrated in the accompanying drawings, in which—

Figure 1 represents a top plan view of our invention as arranged for two draft-animals, one upon each side of a tongue, which is shown broken off and with the eveners shown by dotted lines. Fig. 2 is a side elevation of Fig. 1, partly in section. Fig. 3 is a side elevation of a part of Fig. 1, showing the manner in which the tongue is attached. Fig. 4 is a front end elevation of Fig. 1 with the tongue attached, a part of the tongue-securing means being shown in section. Fig. 5 is a top plan view showing the attachment as adapted for use with two draft-animals with eveners alone. Fig. 6 is a side elevation, partly in section, of Fig. 5; and Fig. 7 is a side elevation of a part of Fig. 5 with the eveners removed.

Similar numerals refer to similar parts throughout the various views.

The truck has two wheels 8 and 9, that are journaled at opposite ends of an arch-shaped axle 10. A bracket 11 is secured to the upper side of the axle, and a stub-tongue 12 is pivotally connected therewith by means of a king-bolt 13, the opposite end of the stub-tongue being adapted to connect with a harvester or like machine in any of the well-known ways. A draft-plate 14 is pivotally connected at its rear end with the king-bolt 13 and lies between the bracket 11 and the axle, and a forked brace 15, having its legs secured to opposite ends of the axle, extends upward and forward and is secured to the draft-plate toward its forward end. A draft-hook 16 is formed on the forward end of the draft-plate, adapted to receive a chain or similar draft appliance. Two loops 17 and 18 are secured to the upper side of the draft-plate and are adapted to form a socket to receive the rear end of a tongue 19 therein. A hammer-strap 20 is pivotally connected with the upper side of the rear loop, and its forward end is provided with an opening to receive a draft-pin 21, that passes through the hammer-strap, evener 22, loop, tongue, and draft-plate, if desired, or it may be used with a less number of those parts.

To remove either tongue or evener, all that is necessary is to remove the draft-pin. The evener being received between the hammer-strap and the upper side of the loop 17, as shown in Fig. 6, it is held as firmly in the absence of the tongue as with it. With both tongue and eveners removed the draft-hook 16 is available as means whereby a chain or other draft device may be attached for use, as desired. The draft-plate 14 extends rearward of the king-bolt 13 and is adapted to limit the downward movement of the tongue.

What we claim as our invention, and desire to secure by Letters Patent, is—

1. In a tongue-truck, the combination of a supporting-axle and wheels, a draft-plate connected with said axle and provided with a draft-hook at its forward end, loops secured to said draft-plate adapted to form a socket to receive a tongue, a hammer-strap secured to the rear loop and extending forward above the front loop, a tongue, an evener and a draft-pin passing through said hammer-strap, evener, loop, tongue and draft-plate.

2. In a tongue-truck, the combination of a supporting-axle and wheels, a stub-tongue pivotally connected with said axle and adapted to connect with a harvester, a draft-plate suitably connected with said axle and extending rearward therefrom and adapted to engage with the under side of said stub-tongue in a manner to limit the downward swing of the forward end of said draft-plate.

3. In a tongue-truck, the combination of an arch-shaped supporting-axle with wheels journaled at opposite ends thereof, a bracket secured to the upper side of said axle, a stub-tongue secured to said axle by means of a kingbolt connecting it with said bracket and adapted to connect with a harvester, a draft-plate having its rear end pivoted on said king-bolt between the axle and said bracket, a forked brace connecting the forward end of the draft-plate with opposite ends of said axle, means for attaching the draft appliances to said draft-plate and said plate extending rearward of its pivotal connection with the king-bolt and adapted to engage with the under side of said stub-tongue in a manner to limit the downward swing of the forward end of said draft-plate.

In witness whereof we hereto affix our signatures in presence of two witnesses.

JOHN W. PRIDMORE.
WILLIAM WEBBER.

Witnesses:
   GEO. W. HENDERSON,
   ALFRED M. CHRISTIAN.